TAPE APPLYING DEVICE WITH TAPE PRINTING MEANS

Filed Dec. 27, 1967 5 Sheets-Sheet 1

Inventor:
David G. Way,
by
Attorney

TAPE APPLYING DEVICE WITH TAPE PRINTING MEANS

Filed Dec. 27, 1967 5 Sheets-Sheet 2

Inventor:
David G. Way,
by Albert Spear,
Attorney

TAPE APPLYING DEVICE WITH TAPE PRINTING MEANS

Filed Dec. 27, 1967 5 Sheets-Sheet 3

Inventor:
David G. Way,
by [signature]
Attorney

June 1, 1971 D. G. WAY 3,582,434

TAPE APPLYING DEVICE WITH TAPE PRINTING MEANS

Filed Dec. 27, 1967 5 Sheets-Sheet 4

Inventor:
David G. Way,
by Albert Spear
Attorney

TAPE APPLYING DEVICE WITH TAPE PRINTING MEANS

Filed Dec. 27, 1967 5 Sheets-Sheet 5

Inventor:
David G. Way,
by Abbott Spear,
Attorney

United States Patent Office 3,582,434

Patented June 1, 1971

3,582,434

TAPE APPLYING DEVICE WITH TAPE PRINTING MEANS

David G. Way, Boxborough, Mass., assignor to Tapeler Corporation, Newton, Mass.

Filed Dec. 27, 1967, Ser. No. 693,795
Int. Cl. B41m *1/36*
U.S. Cl. 156—385 3 Claims

ABSTRACT OF THE DISCLOSURE

Device for applying tape, the device having a rotatable feed member, means first to turn the member to advance the tape into a predetermined position disposed towards but spaced from the surface to which the tape is to be applied and then to move the member into and out of tape-applying position, and means to effect engagement of a printing member with the tape and subsequent disengagement therefrom as functions of the operation of the first named means.

Figures 1, 2:
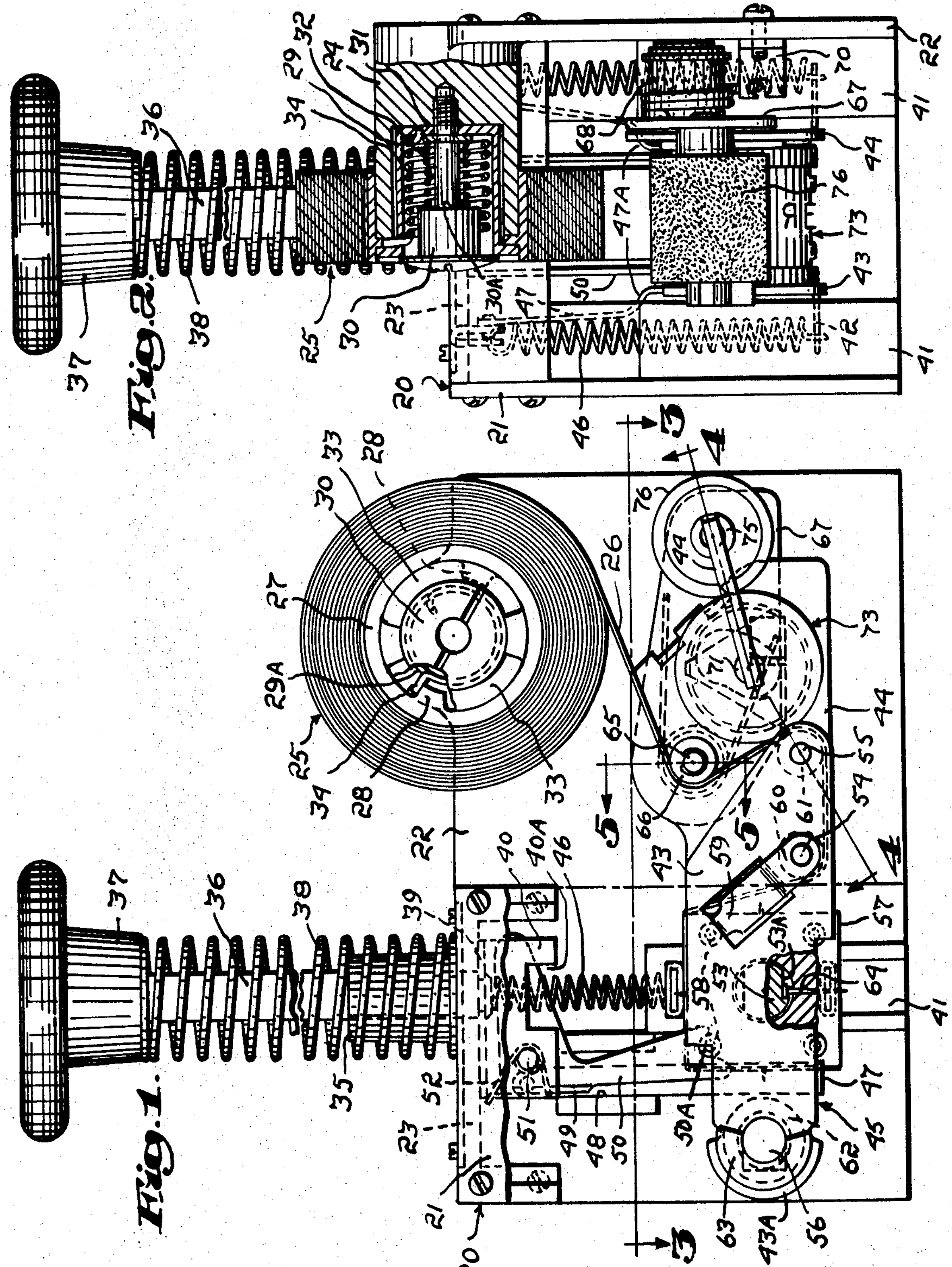

There are many uses for applying lengths of tape from a source. One use is in the labelling of items with indicia and where the indicia are price markings, problems exist because, for example, prices vary from item to item. As a consequence, there is need for a tape-applying device in which the tape is printed as it is used and the printing member is either replaceable or adjustable.

The general objective of the invention is to provide dispensers with such printing means and this objective is attained with a tape dispenser of the type having a rotatable feed member and means operable first to turn the feed member to advance the tape into a predetermined position in which a length of tape is disposed towards but spaced from the surface to which it is to be applied and then to move the feed member into and out of tape-length applying contact with that surface. The dispenser has a printing member and means to effect printing contact between the printing member and the tape and their separation, both the printing contact and the separation being functions of the operation of the first named means.

Another objective of the invention is to provide such a dispenser with a rotatable printing member that contacts the tape while the feed member is turning and is disengaged therefrom while the feed member is moved relative to the surface.

Another objective of the invention is to provide such a device with a printing member that is stationary and engaged by and disengaged from the tape during the tape length applying movement of the feed member.

Yet another objective of the invention is to provide such a device with a printing member that is moved into and out of printing contact with the tape while the tape is stationary.

In the accompanying drawings, there are shown illustrative embodiments of the invention from which these and other of its objectives, novel features, and advantages will be readily apparent.

Figures 3, 4, 5, 6:
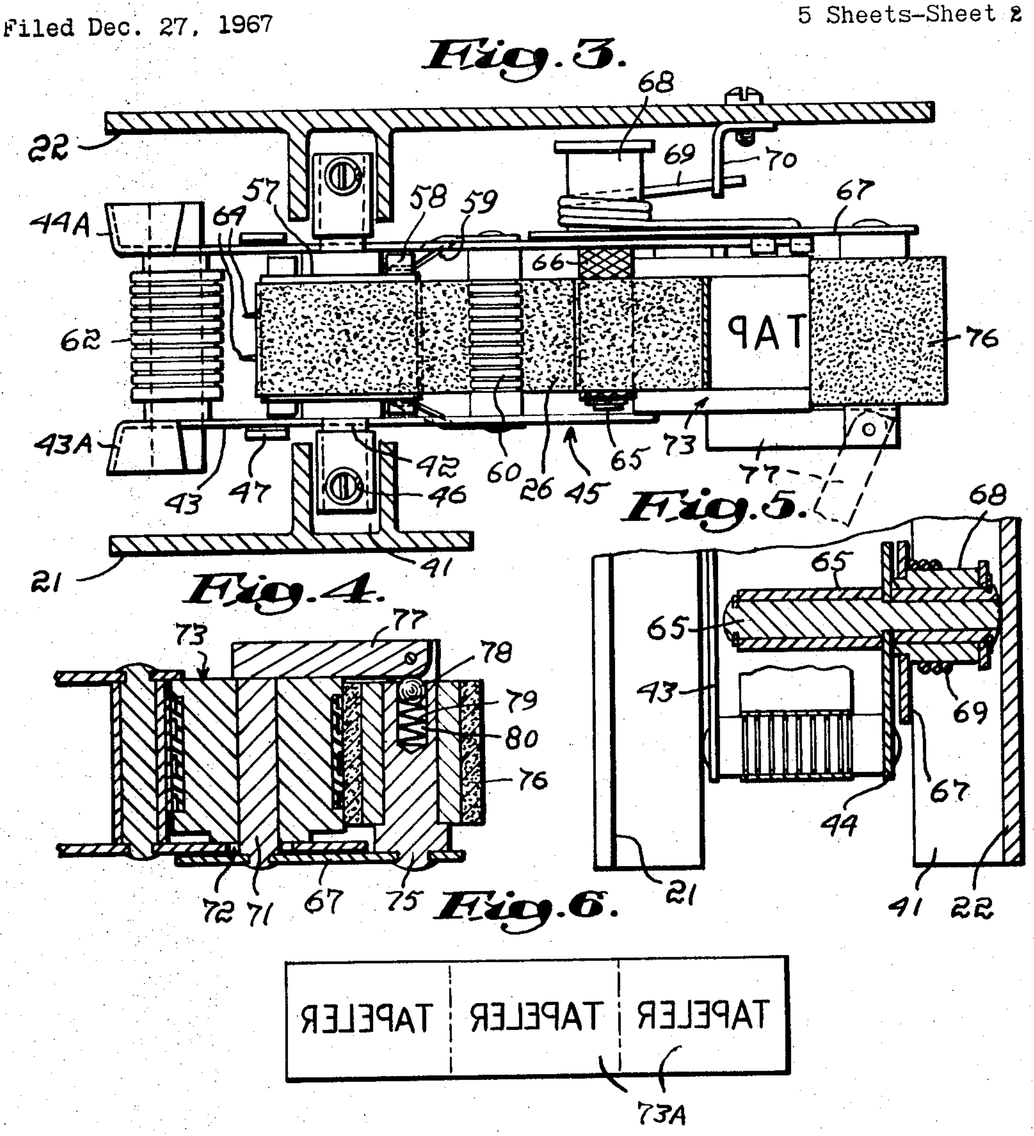
Figure 7:
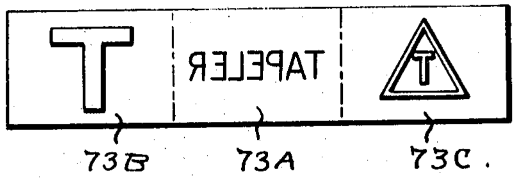
Figure 8:
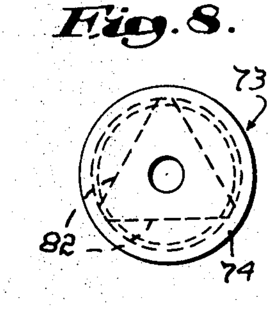
Figure 9:
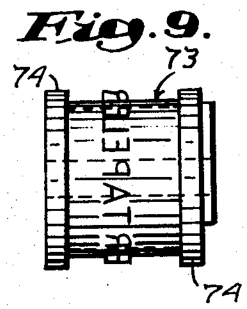
Figure 10:
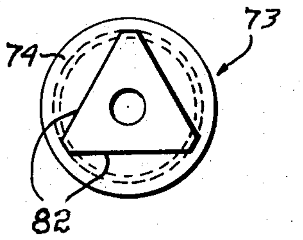
Figure 11:
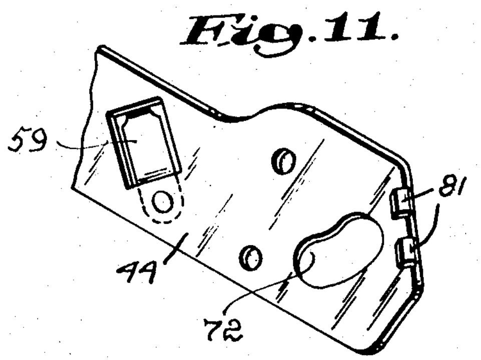
Figures 12, 13:
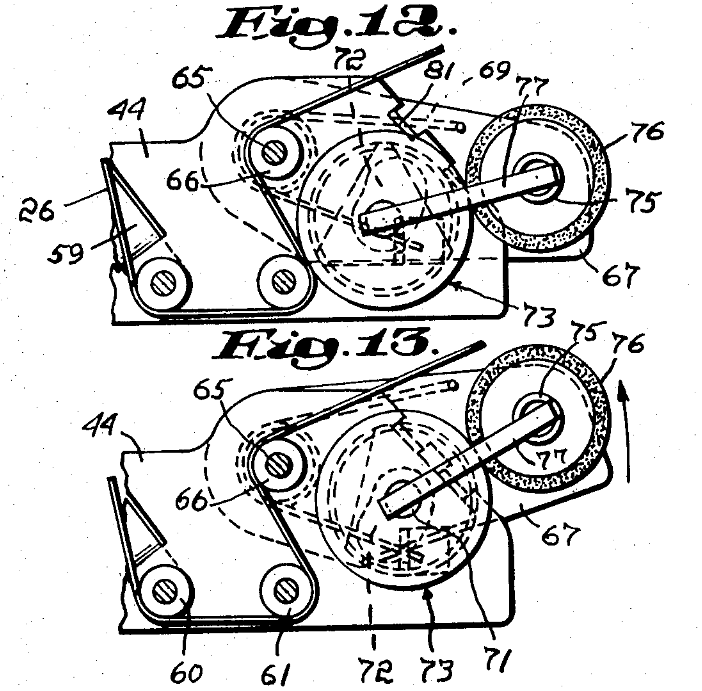
Figure 15:
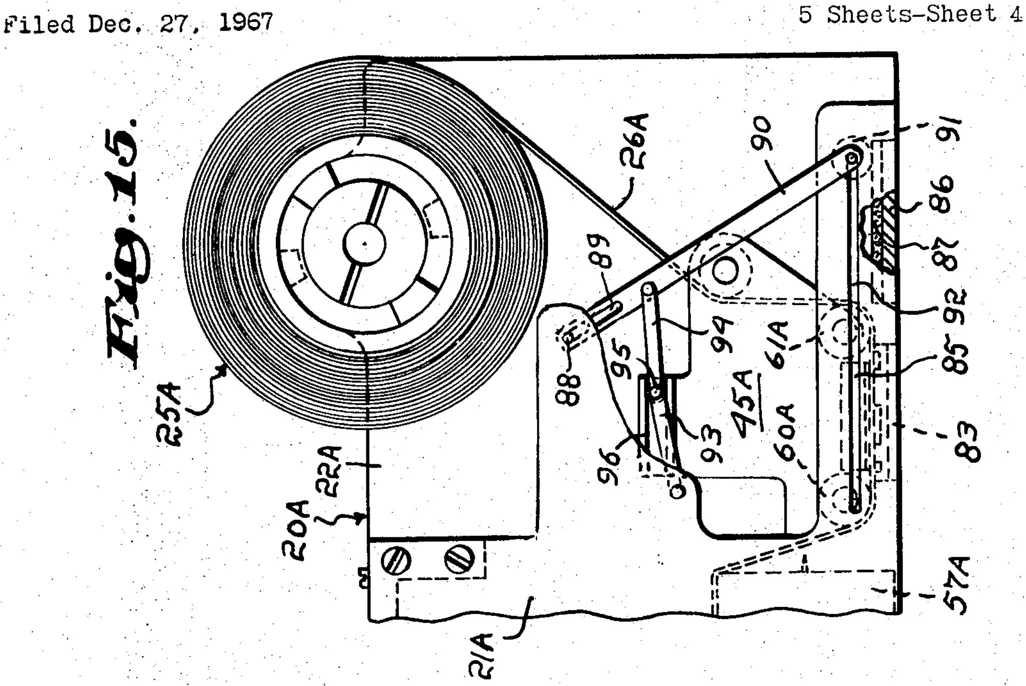
Figure 14:
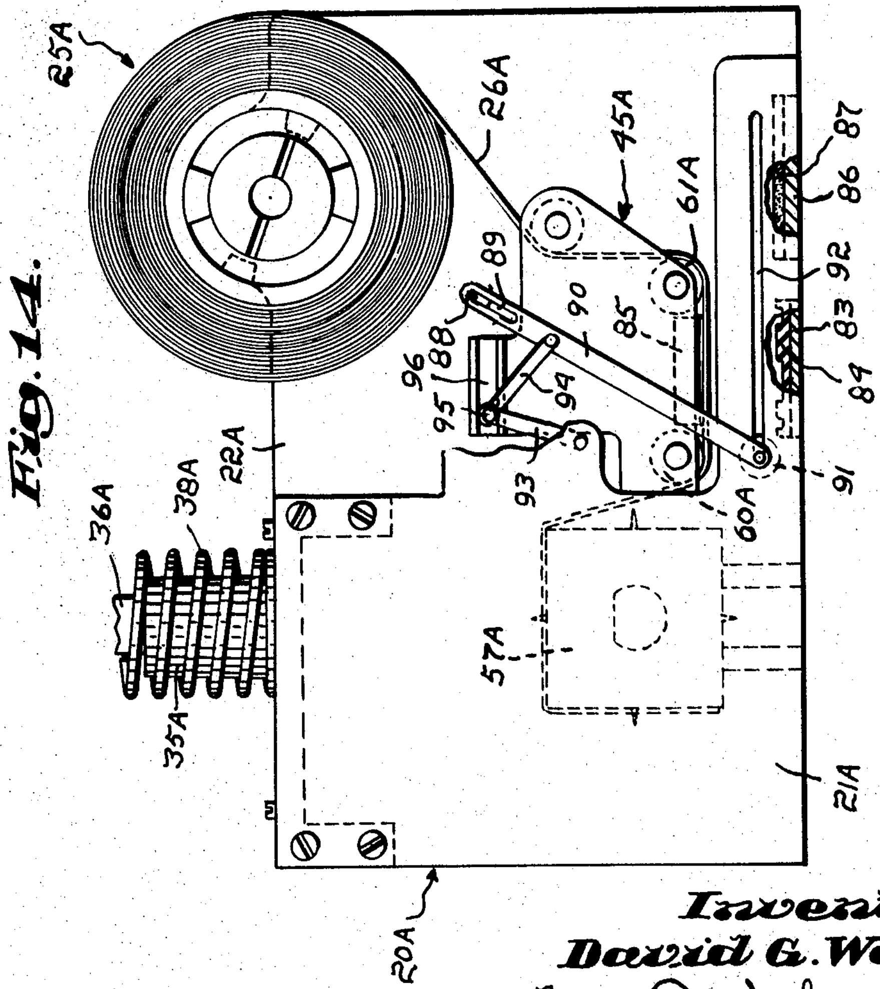
Figures 16, 17, 18, 19:
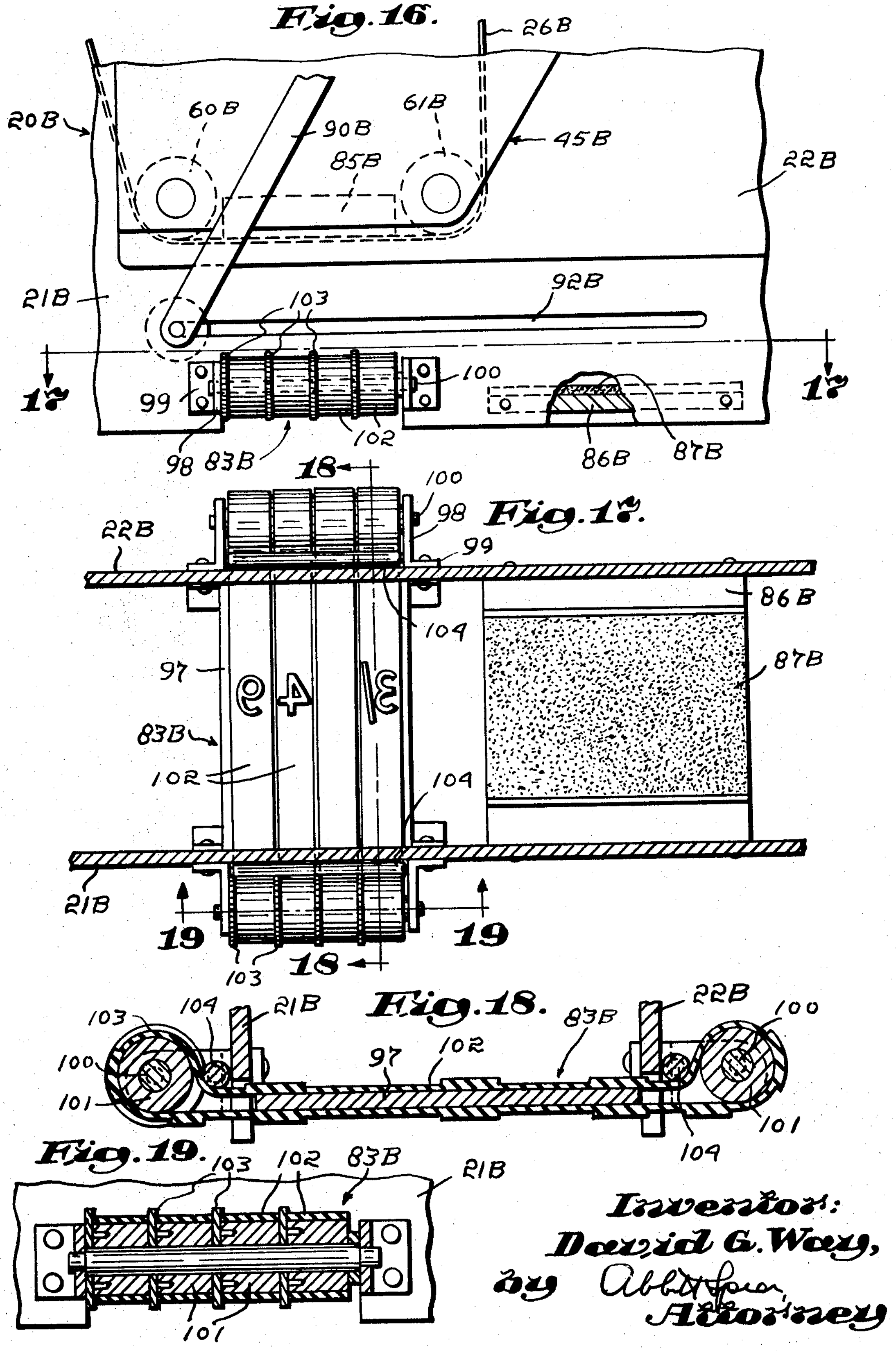

In the drawings:

FIG. 1 is a partly broken away side view of a tape dispenser in accordance with the invention, FIG. 2 is a partly sectioned rear end view thereof, FIG. 3 is a section taken approximately along the indicated lines 3—3 of FIG. 1, FIG. 4 is a section taken approximately along the indicated lines 4—4 of FIG. 1, FIG. 5 is a section taken approximately along the indicated lines 5—5 of FIG. 1, FIG. 6 is a development of the printing surface of a roll, FIG. 7 is a like view of another printing roll surface, FIG. 8 is a view of the outer end of the printing roll, FIG. 9 is a side view thereof, FIG. 10 is a view of the inner end of the printing roll, FIG. 11 is a fragmentary, perspective view of the inside member of the reciprocable frame, FIG. 12 is a fragmentary side view of the inside frame member and the mount pivotally connected thereto showing the frame positioned with the printing roll in contact with the tape, FIG. 13 is a like view but with the mount pivoted to disengage the printing roll from the tape, the frame having moved downwardly from its FIG. 12 position, FIG. 14 is a partly broken away side view of a tape dispenser in accordance with another embodiment of the invention, FIG. 15 is a fragmentary side view of the dispenser of FIG. 14 showing the position of the parts when the reciprocable frame is in the position it occupies when the tape is applied, FIG. 16 is a fragmentary and partly broken away side view of a tape dispenser in accordance with yet another embodiment of the invention, FIG. 17 is a section taken approximately along the indicated lines 17—17 of FIG. 16, and FIGS. 18 and 19 are sections taken, respectively along the indicated lines 18—18 and 19—19 of FIG. 17.

The tape may be of a pressure sensitive, heat sensitive, or pressure-heat sensitive type.

The tape roll 25 has a length of tape 26 wound on a core 27 dimensioned to fit the support 24 for rotation independently thereof an the tape has its adhesive coated surface disposed inwardly. At the end of the core 27 that is exposed when the roll is in place on the support 24, there are a pair of diametrically opposed, inwardly extending, spaced lugs 28.

The tape roll 25 is detachably secured to the support 20, in accordance with said application, with a cup-shaped member 29, see FIG. 2, fitting freely in the support 24 and attached thereto by a bolt 30 extending through a washer 31 seated against the closed end of the member 29 by a spring 32 backed by the shoulder 30A of the bolt 30 and rotating therewith thus to provide an adjustable drag on the rotation of the member 25.

The cup-shaped member 29 has, at its outer, open end a pair of outwardly disposed flanges 33 and a slot 29A behind one of them through which one end of a coil spring 34 extends. The other end of the spring 34 is anchored in the closed end of the member 29. The flanges 33 are so spaced and dimensioned that the lugs 28 may be entered between them and the outer end of the support 24 and, when the roll 25 is turned in its unwinding direction, clockwise as viewed in FIG. 1, the lugs 28 enter and remain in back of the flanges 33 with one lug 28 engaging the end of the spring 34 that is disposed outwardly through the slot 29A. The roll 25 is thus not only detachably secured and its rotation controlled by the adjustable drag but also the spring 34 yields to absorb pulls on the tape and then reacts to take up slack.

The housing wall 23 has an upwardly disposed boss 35 slidably guiding an actuating stem 36 having a knob 37 fixed on its upper end and yieldably held in tis raised position by a coiled spring 38 held centered by the boss 35 between the wall 23 and the undersurface of the knob 37. The raised position of the stem 36 is determined by a stop 39 fixed on its lower end and having depending side walls 40, each centrally notched as at 40A while the boss 35, engageable by the knob 37, limits the downward movement of the stem 36.

The side walls 21 and 22 have opposed, vertical channels 41 for guide arms 42 on the side member 43 and 44 of a generally indicated frame 45. Each guide arm 42 is shown as connected by a spring 46 to the wall 23 thus yieldably maintaining the frame 45 in a raised position in which it is held by hangers 47 secured to the wall 23 and extending downwardly through channels 48 fixed on the side walls 21 and 22 and including inwardly inclined shoulders 47A.

A U-shaped member 49 includes a pair of transversely aligned, depending pawls 50 as its sides and is connected to the side walls 40 of the stop 39 by a pivot 51 with the member 49 yieldably held aagainst the stop 39 by the spring 52.

The side members 43 and 44 of the frame 45 are interconnected in spaced relation by axles 53, 54, 55 and 56, the axle 53 rotatably supporting a tape feed member 57, shown as square in cross section to provide flat, tape-carrying faces with the corners constituting linear cutting edges. Pins 58 extend transversely through both ends of the member 57, one adjacent each corner for engagement by the pawls 50 whose free ends are notched as at 50A to straddle the appropriate pin 58. The frame side members 43 and 44 also are provided with yieldable latches 59 engageable with appropriate pins 58 as the tape feed member 57 turns, counterclockwise as viewed in FIG. 1, to prevent its turning to any unwanted extent in the other direction.

The axles 55 and 56 rotatably support knurled rollers 60 and 61, respectively, and the tape 26 extends from the supported roll under the rollers 60 and 61 upwardly and forwardly over the uppermost flat face of the feed member 57, downwardly over the leading vertical flat face and tightly around the intermediate corner with the forked ends of the pawls 50 in engagement with the ends of the pin 58 at that corner as shown in FIG. 1.

When the knob 37 is pushed downwardly, the member 57 is turned a quarter turn in counterclockwise direction with each corner travelling through an arc of 90° with another pin 58 becoming positioned for engagement with the forked ends of the pawls 50. In practice, the pawls 50 are so dimensioned that their full stroke does not quite turn the member 58 a complete quarter turn and as the latches 59 are not then in holding engagement with a pin 58, the member 57 may rock on engagement with the surface.

The axle 56 rotatably supports an anvil 62 that is so located that, as the feed member 57 turns, it is engaged by the tape-coated corner and on such engagement, it exerts cutting pressure on the tape 26 against the linear cutting edge provided by that corner thus to sever the tape to provide a section to be applied to the surface when the quarter turn of the member 58 is completed. In practice, the axle 56 is a loose fit in the frame members 43 and 44 and is held in its operative position by a rubber bearing 63 backed by the outturned ends 43A and 44A of the frame members.

It will also be noted that the downward movement of the knob 37 is attended by the release of the hangers 47 as a result of the camming engagement of the stop side walls 40 with the hanger shoulders 47A and then by the downward movement of the frame 45 as a result of the engagement of the stop side walls 40 with the frame side walls 43 and 44, the cut tape section being pressed against the surface on the completion of such downward movement.

The feed member 58 has headed pins 64 extending outwardly through each face with their heads riding on the axle 53 which has a cam-shaped recess 53A in the zone of the flat face that is downwardly disposed. The pins engage and puncture the tape to cause its positive movement with the member 57 as it turns and to hold the severed section, the recess 53A permitting the pins 64 to be forced inwardly on contact of the downwardly disposed face with the surface that is to receive the severed tape section and then forcing them outwardly on the next turn of the member 57.

The structure as thus far described will enable the features of the tape-printing in accordance with the invention to be readily understood as it makes apparent that the downward movement of the knob 37 first turns the feed member 57, resulting in the advance of the tape to bring a length in a position disposed towards but spaced from the surface to which it is to be applied, and then the movement of the feed member 57 and its frame 45 into and out of a position in which the tape is applied to a surface.

Turning now to the means by which the tape 26 is printed, it will be seen that the wall 44 of the frame 45 extends rearwardly beyond the rear edges of the wall 44 and carries an axle 65 for a knurled roller 66 about which the tape 26 is trained. A mount 67, in back of the side member 44, see FIGS. 3–5, has a hub 68 supported by the axle 65 and a coil spring 69 carried by the hub 68 has one of its ends anchored to the mount 67 and the other of its ends caught in a keeper 70 fixed on the wall 22. As a consequence, as the frame 45 moved towards the surface, the mount 67 is swung upwardly.

The mount 67 has an axle 71 extending outwardly through a slot 72 in the side member 44, see FIGS. 4 and 11 the slot 72 being dimensioned to permit the swinging of the mount 67. A generally indicated printing roll 73 is rotatably supported by the axle 71 and in the normal position of the mount 67, see FIG. 12, the printing roll 73 is in contact with the tape and its rubber end rings 74, see FIG. 9, are in contact with the roll 66 so that the printing roll 73 is rotated as the tape 26 is advanced. The mount 67 also has an axle 75 rotatably supporting the inking roll 76 which contacts the printing roll 73 so that it turns therewith. As shown in FIG. 4, a keeper 77 is pivotally attached to the axle 75 to swing transversely against the exposed ends of the rolls 73 and 76. A ball 78 backed by a spring 79 in a bore 80 in the axle 75 yieldably holds the keeper 77 in its operative position while permitting it to be swung into alignment with the axle 75 thereby to enable the printing and inking rolls to be slipped from their axles and to be replaced.

In the position of the frame 45 in which it is held by the hangers 47, the printing roll 73 is in contact with the tape 26 and turns as the tape is pulled from the roll 25 as the knob 27 is depressed to turn the feed member 57. When, however, the frame 45 is moved downwardly, as the knob 27 is further depressed to deposit a tape section on the surface, the spring 69 swings the mount 67 and the printing roll 73 is thus moved out of printing contact with the tape 26, see FIG. 13. To ensure that the printing roll 73 is properly positioned, the side member 44 is provided with shoulders 81, best seen in FIG. 11, and the inner end of the printing roll 73 see FIG. 10, has projections 82, one for each circumferential extent the printing roll 73 is turned when the dispenser is actuated to deposit a length of tape. A printing roll 73 of the type shown in the drawings is turned approximately one-third a revolution each such tape length deposit and there are, accordingly, three projections 82 defining an equilateral triangle. When the frame 45 moves downwardly into a position in which the feed member 57 applies a length of tape, the appropriate one of the projections 82 engages the shoulders 81 as may be seen in FIG. 13, to hold the printing roll against turning.

The indicia on the printing roll 73 may be such as indicated at 73A as to repeat on each contact of the printing roll with the tape as illustrated by FIG. 6 or it may have additional indicia indicated at 73B and 73C, provide for a different print on each partial rotation as illustrated by FIG. 7.

In the embodiment of the invention illustrated by FIGS. 14 and 15, the tape dispenser is substantially the same so that it is not described except as to the important differences and corresponding parts are indicated by the suffix addition A to the corresponding reference numerals.

The housing 20A carries a transverse holder 83 for printing indicia 84 adjacent the bottom edges of its walls 21A and 22A and rearwardly of the path of the tape feed member 57A. The reciprocable frame 45A has its knurled rolls 60A and 61A spaced apart to receive between them a length of tape 26A to receive the printing indicia in the holder 83. Between the rolls 60A and 61A, the frame 45A has a knurled backing surface 85 spaced slightly from the plane of the tape 26A when it is advancing but engageable thereby when the tape 26A is in printing contact with the printing indicia in the holder 83.

If the printing indicia is not of the ink-impregnated type, it must be inked. For this purpose, the housing 20A is shown as having a transverse support 86 for an inking pad 87 and the wall 22A has a pivot 84 extending through a slot 89 in the upper end of an arm 90. An inking roll 96 is rotatably supported on the lower end of the arm 90 with its ends caught in a guide slot 92. The arm 88 is under the influence of means operative to cause the inking roll 91 to transverse the printing indicia and the inking pad 87 and then return to its FIG. 14 position thus to ink the printing indicia each time a length of tape is applied to a surface. As illustrative of such means, links 92 and 93 are pivotally connected to the housing and to the arm 90, respectively. The links 92 and 93 are pivotally interconnected by a pivot 94 slidable in the longitudinal keeper slot 95 on the frame 45A thus to effect the swinging of the arm 90 to bring the inking roll 91 into and out of contact with the inking pad 87 each time the device is actuated to apply a length of a printed tape.

The embodiment of the invention illustrated by FIGS. 16–19 is sufficiently similar to those previously described to make a full description thereof unnecessary and corresponding parts are distinguished by the suffix addition "B" to their reference numerals.

The embodiment of the invention differs from the embodiment just described in that the generally indicated, printing indicia holder 83B is adjustable.

The holder 83B is shown as a detachable unit consisting of an intermediate plate 97 having sides 98 adjacent each end with each side 98 formed with a flange 99 by which the unit is detachably attached to the side walls 21B and 22B. At each end of the unit, there is an axle 100 supported by brackets 98 and each axle 100 has a series of hubs 101 rotatably supported thereby. Bands 102 bearing printing indicia are trained about corresponding hubs 101 with the hubs 101 on at least one axle 100 having wheel portions 103 enabling each band to be moved in either direction to bring wanted printing indicia into printing position on the plate 97. It will be noted that each axle 100 is supported by the sides 21B and 22B a sufficient distance above the surface to which the tape lengths are to be applied, see FIG. 18, to avoid contact of the wheel portions 103 therewith and for this reason, guide rolls 104 are supported by the sides of the unit, one adjacent each axle 100 to maintain the bands 102 against the plate 97.

From the foregoing, it will be appreciated that tape dispensers in accordance with the invention are well adapted to meet a wide range of requirements when printing of tape, as it is being used, is wanted.

I claim:

1. In a device for applying adhesive tape from a source to a surface, a rotatable feed member, reciprocable means operable first to turn said member to advance the tape into a predetermined position in which a length of tape is disposed with its adhesive coat towards but spaced from the surface and then to move said member into and out of tape length applying contact therewith while the feed member is moved relative to the surface, a rotatable printing member between the tape source and the feed member, said means including a pivotable holder on which the printing member is rotatably supported and means operable, while the feed member is moved relative to the surface to swing the holder from a first position in which the printing member contacts the tape while the feed member is turning into a second position in which the printing member is disengaged from the tape.

2. The device of claim 1 in which there is a fixed wall and the holder-swinging means includes a resilient connection with the wall yieldably maintaining the holder in the position in which the printing member engages the tape.

3. The device of claim 1 in which the first named means also includes a shoulder, and the printing member has a series of printing indicia equally spaced about its periphery and a series of shoulders, one for each of the series of indicia and engageable with the shoulder of the first named means, the printing member being turned into a predetermined position by such engagement in the second position of the holder.

References Cited

UNITED STATES PATENTS

| | | | |
|---|---|---|---|
| 1,307,891 | 6/1919 | Berkowitz | 156—385 |
| 1,812,980 | 7/1931 | Penney | 156—385 |
| 2,502,257 | 5/1950 | Hawkins et al. | 156—385 |
| 2,764,934 | 10/1956 | Kaplan | 156—385X |
| 1,056,626 | 3/1913 | Bylicki et al. | 156—385 |
| 3,256,813 | 6/1966 | Casey | 101—292 |

BENJAMIN A. BORCHELT, Primary Examiner

R. E. HART, Assistant Examiner

U.S. Cl. X.R.

101—269, 228